(12) United States Patent
Demulder

(10) Patent No.: US 9,192,105 B2
(45) Date of Patent: Nov. 24, 2015

(54) AGRICULTURAL BALER TUCKER FINGER PROTECTION

(71) Applicant: Carl F. Demulder, Ottumwa, IA (US)

(72) Inventor: Carl F. Demulder, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 464 days.

(21) Appl. No.: 13/662,974

(22) Filed: Oct. 29, 2012

(65) Prior Publication Data
US 2014/0116273 A1 May 1, 2014

(51) Int. Cl.
A01F 15/14 (2006.01)

(52) U.S. Cl.
CPC .................... *A01F 15/145* (2013.01)

(58) Field of Classification Search
CPC ....... A01F 15/07; A01F 15/14; A01F 15/145; A01F 2015/143; B65B 27/12; F16B 37/14
USPC ....... 100/19 R, 20, 24, 33 R; 289/10; 56/433, 56/435, 439, 441, 442, 444, 445; 411/340, 411/372, 372.5, 372.6, 373, 374, 429, 431
See application file for complete search history.

(56) References Cited

U.S. PATENT DOCUMENTS

| 2,606,791 | A | * | 8/1952 | Specht | 301/5.7 |
| 2,793,890 | A | * | 5/1957 | Smith | 289/9 |
| 2,872,860 | A | | 2/1959 | Smith et al. | |
| 2,926,599 | A | * | 3/1960 | McClellan | 100/22 |
| 3,079,202 | A | * | 2/1963 | Evans | 301/108.5 |
| 4,511,182 | A | * | 4/1985 | Birnbaum | 301/37.42 |
| 4,999,963 | A | * | 3/1991 | Verble | 52/410 |
| 5,690,290 | A | * | 11/1997 | Asano et al. | 242/283 |

FOREIGN PATENT DOCUMENTS

DE 3032908 A1 4/1982
EP 2108247 A1 10/2009

OTHER PUBLICATIONS

European Search Report in counterpart application No. 13190054.0, dated Mar. 4, 2014 (6 pages).

* cited by examiner

*Primary Examiner* — Jimmy T Nguyen

(57) ABSTRACT

An agricultural baler including a base unit, a plurality of ground engaging devices supporting the base unit and at least one tie system mounted to the base unit. The at least one tie system including a tucker finger and a cap. The tucker finger being rotatable about an axis relative to the base unit. The cap covering a portion of the tucker finger being proximate to the axis.

13 Claims, 4 Drawing Sheets

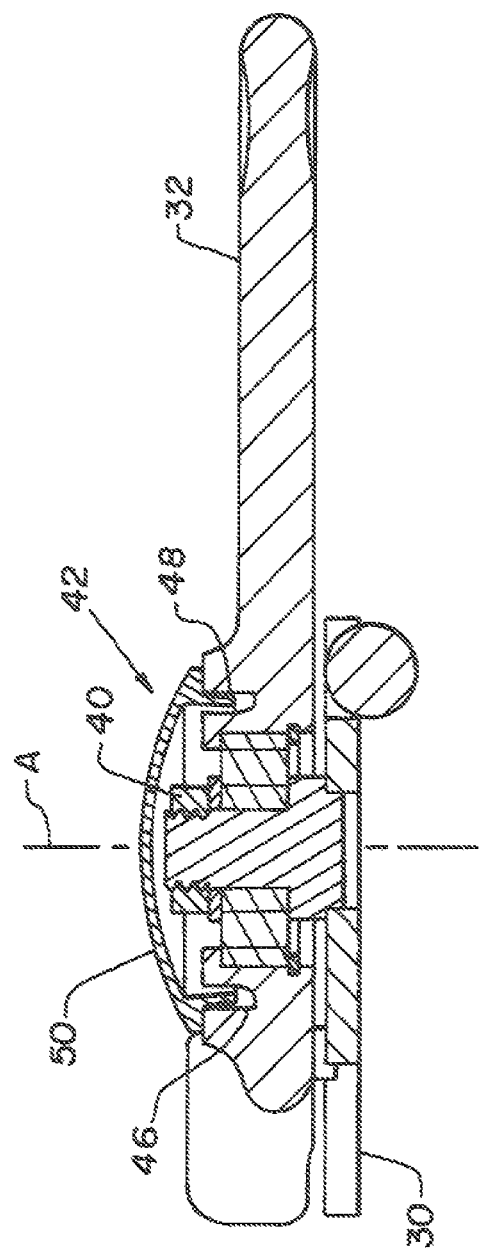

AGRICULTURAL BALER TUCKER FINGER PROTECTION

FIELD OF THE INVENTION

The present invention relates to an agricultural baler, and, more particularly, to an apparatus to protect the tucker finger of an agricultural baler.

BACKGROUND OF THE INVENTION

A cut and raked crop that has been dried or otherwise prepared in a field, such as hay, straw or other agricultural material is often gathered, compressed and shaped by an agricultural baler. There are several types of balers that are commonly used, each resulting in different types of bales. Some are rectangular and some are cylindrical of various sizes. Bales can be bound with netting, strapping, wire or traditionally twine using a tie system to connect ends of the twine. Large square balers often use a double tie knotting system. The double tie knotter ties two knots, one to complete the previous bale, and another to start the next or current bale. Twine is then directly fed out of the twine galls during bale formation. A typical large square bale weighs between 800 and 1,600 pounds and is often dropped in the field by the baler, for later retrieval, as the baling system proceeds though the field.

A baler that produces small rectangular bales, often also called square bales, produce bales that are typically wrapped with two strands of knotted twine. The bales are light enough for easy handling and typically weigh from 40 to 80 pounds each. A bale is formed by a series of processes performed by the square baler including lifting the windrowed material, hereinafter referred to as hay, by way of the pickup portion of the baler. The hay is then moved by way or an auger into a chamber that has a feeding fork. The feeding fork moves the hay in front of a sliding plunger with a cutting edge that cuts the hay and moves the hay in the chamber into previously packed hay therein causing the hay to be compressed. Once a predetermined amount of hay has been gathered in the chamber, as measured by the amount being extruded through the opening at the rear of the chamber, a mechanism is triggered causing the twine to be threaded through the hay, cut and then knotted thereby forming the bale and one portion of the twine is retained to start to receive hay for the next bale. As the bales are moved through the compression channel out to the rear of the baler, the baled hay is then either loaded onto a wagon or dropped into the field for later retrieval.

To operate properly the tie system of either a large or small square baler requires the twine to move properly without snagging on parts of the baler so that the twine is positioned for proper knotting by the tie system. The tie system itself carries out a choreographed sequence of operations, which is subject to malfunction if the twine is snagged or it debris from the baling process interferes with any one of the tie system elements.

What is needed in the art is a baler that configures the tucker finger of the tie system to preclude the compromising of the tucker finger by debris.

SUMMARY

The present invention provides a protective device for the tucker finger of an agricultural baler.

The invention in one form is directed to an agricultural baler including a base unit, a plurality of ground engaging devices supporting the base unit and at least one tie system mounted to the base unit. The at least one tie system including a tucker finger and a cap. The tucker finger being rotatable about an axis relative to the base unit. The cap covering a portion of the tucker finger proximate to the axis.

The invention in another form is directed to at least one tie system used in an agricultural baler. The at least one tie system includes a tucker finger and a cap. The tucker finger being rotatable about an axis relative to the baler. The cap covering a portion of the tucker finger proximate to the axis.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 4 is a sectioned view of the tucker finger assembly of the tie system of FIGS. 1-3.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION

Figure 1:
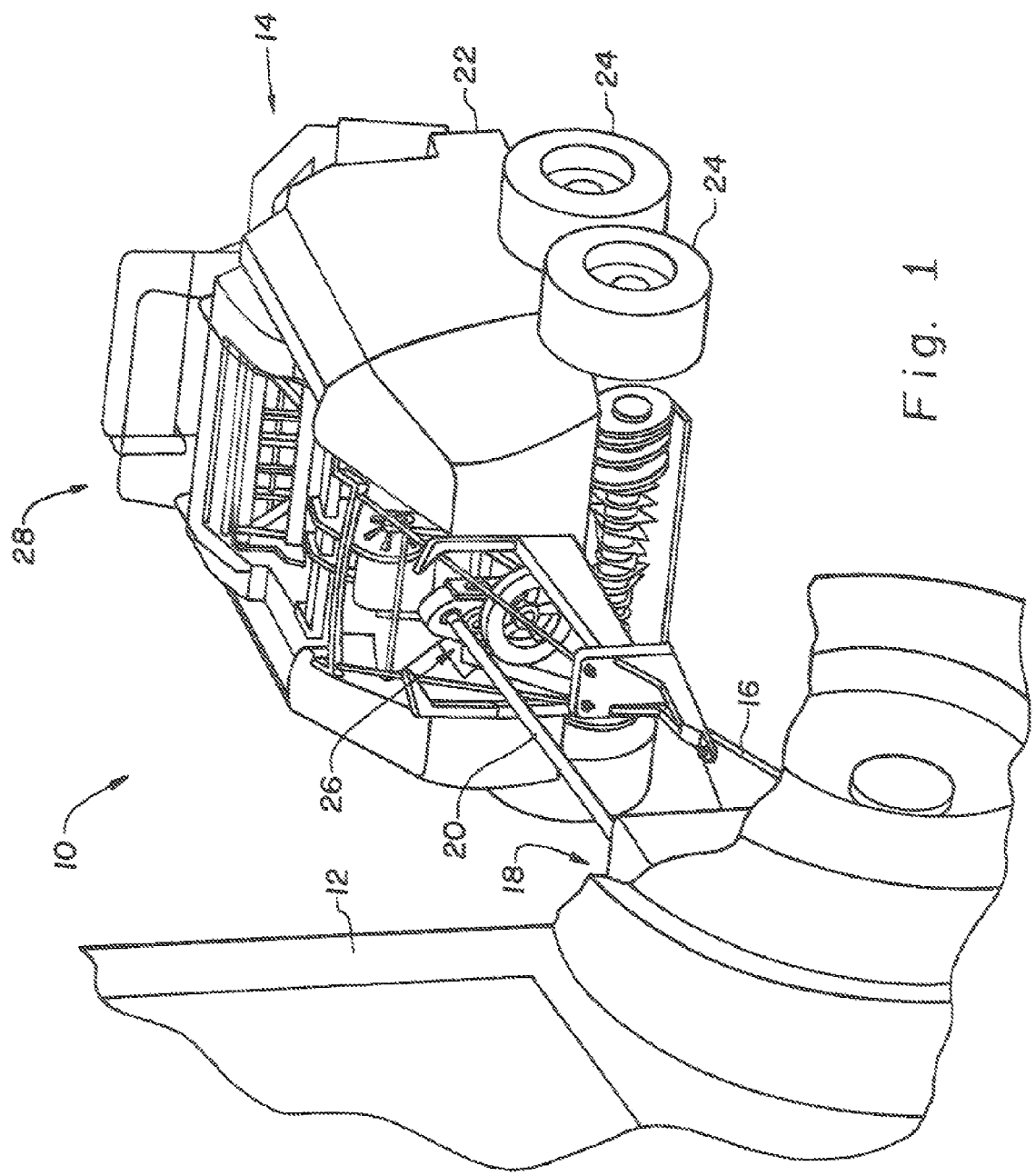
FIG. 1 is a perspective partially sectioned view of a baling system including an embodiment of a tie system of the present invention.

Referring now to the drawings, and more particularly to FIG. 1, there is illustrated a baling system 10 including a tractor 12, and a baler 14. Baler 14 is connected to tractor 12 by way of hitch 16 thereby providing towing for the movement of baler 14. Tractor 12 additionally has a power takeoff (PTO) unit 18 providing rotational power by way of PTO shaft 20 to mechanisms in baler 14.

Baler 14 includes a base unit 22, ground engaging devices 44 and a transmission 26 connected to base unit 22. PTO shaft 20 connects to transmission 26 providing rotational power to transmission 26. A tie system 28 is powered indirectly by power transmitted to baler 14 by shaft 20, and tie system 28 may have several knotting mechanisms associated with baler 14. For example, a large square baler with a width of 4 feet and a height of 3 feet typically has 6 knotting mechanisms to tie the twine strands that extend around the large square bale.

Figure 2:
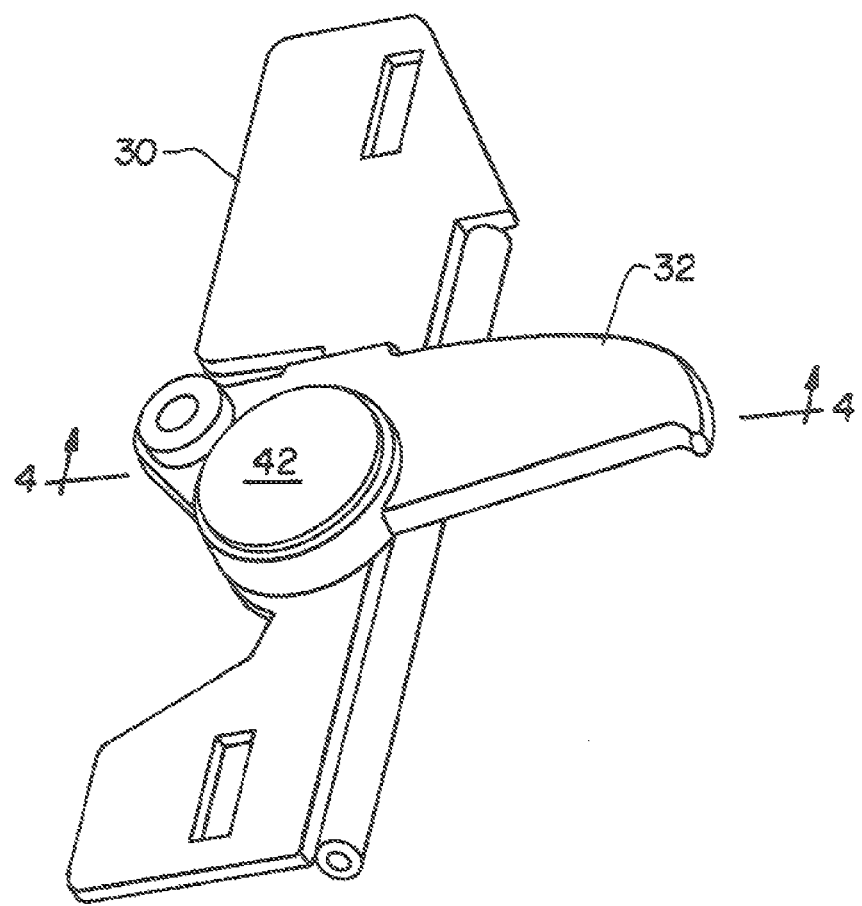
FIG. 2 is a perspective view of a tucker finger assembly of the tie system used in FIG. 1.
Figure 3:
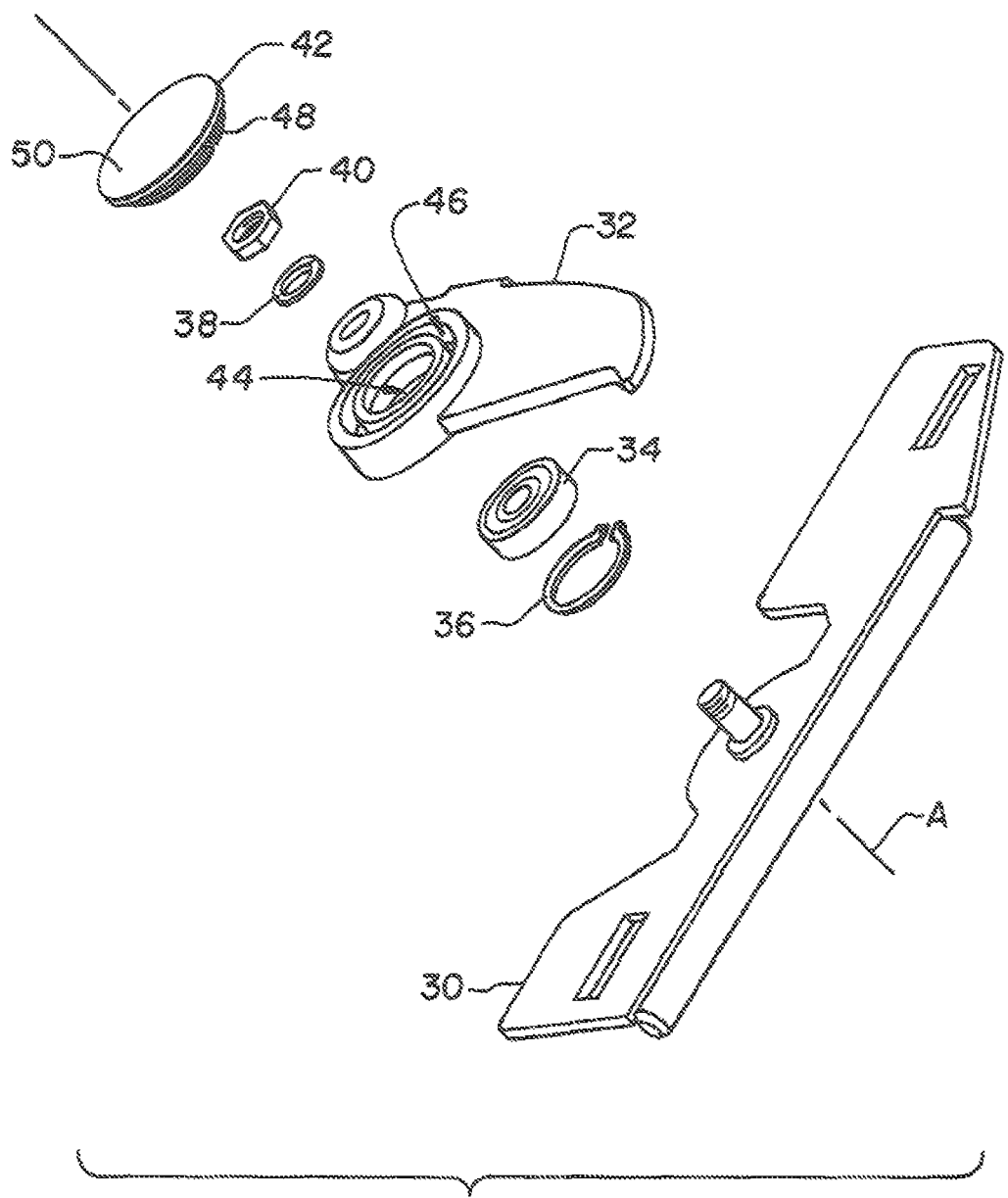
FIG. 3 is an exploded view of tile tucker finger assembly of the tie system of FIGS. 1 and 2.

Now, additionally referring to FIGS. 2-4, there is shown a tucker finger assembly that is part of tie system 28 and specifically the tucker finger assembly having a base plate 30, a tucker finger 32, a bearing 34, a snap ring 36, a washer 38, a nut 40 and a cap 42. Bearing 34 is inserted into a through hole 44 of tucker finger 32 and is retained therein with snap ring 36. Through hole 44 has a shoulder against which part a bearing 34 rests, so that bearing 34 is retained between the shoulder and snap ring 36. A threaded stud, which may be welded to base plate 30, extends from base plate 30 and though bearing 34, with washer 38 and nut 40 being used to secure the tucker finger assembly to base plate 30. Washer 38 is sized so that it engages the inner race of bearing 34 to allow tucker finger 32 to rotate about axis A. A connecting rod (not shown for purposes of clarity) is connected to the remaining hoe on tucker finger 32 to thereby control the rotational movement of tucker finger 32 about axis A. The connecting rod is adjustable to allow for changing rotational position of trucker finger 32. Base plate 30 has two slots through which threaded fasteners extend so that base place 30 can be laterally adjustably positioned.

An annular groove 46 is positioned on tucker finger 32 that is substantially concentric with axis A and with through hole 44. Cap 42 has an annular protrusion 48 that extends from an underneath side of cap 42. Annular protrusion 48 is sized to engage groove 46 such that cap 42 is thereby retained by tucker finger 32. Protrusion 48 may be positioned on cap 42 so that one side of protrusion 48 is biased against a side of groove 46. It is also contemplated that both sides of protrusion 48 may engage both sides of groove 46. A bevel along an outer portion of protrusion 48 allows for case of insertion of protrusion 48 into groove 46. It is additionally contemplated that sonic other retention regime may be used to hold cap 42 to tucker finger 32.

An outer surface 50 of cap 42 has a generally hemispheric or semi-hemispheric shape, with the interior being generally parallel thereto so that the interior clears nut 40 and any extension of the threaded stud. Surface 50 provides a smooth outer presentation so that twine, which my rub thereover, will not snag or be cut by otherwise exposed parts underneath cap 42. Surface 50 is so contoured to be substantially flush or to smoothly meld with the outer surface of tucker finger 32.

Tucker finger 32 may be a casting that is formed to accept cap 42. Cap 42 may alternatively be made to interface with an inner diameter of through hole 44 so as to be retained thereby. Cap 42 advantageously allows twine to pass and rub over surface 50 and also protects the hardware below cap 42 from the build up of debris. Cap 42 is easily removed by using a prying action of a fiat bladed screwdriver and is easily replaced. It is also contemplated that cap 42 may be threaded and screwed onto a portion of tucker finger 32, or onto a portion of the threaded stud that extends from base plate 30 and through nut 40.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler, comprising:
 a base unit;
 a plurality of ground engaging devices supporting said base unit; and
 at least one tie system mounted to said base unit, said at least one tie system including:
 a tucker finger rotatable about an axis relative to said base unit, said tucker finger having a through opening centered about said axis, said tucker finger having a groove spaced apart from said through opening, said groove having inner and outer sides;
 a bearing installed in said through hole; and
 a cap covering said bearing, said through hole, and said groove, said cap having an annular protrusion that engages the outer side of the groove, said cap rotating with said tucker finger.

2. The agricultural baler of claim 1, wherein said cap is substantially symmetrically connected to said tucker finger about said axis.

3. The agricultural baler of claim 1, wherein said groove is substantially concentric with said through opening.

4. The agricultural baler of claim 3, wherein said cap is concentrically located relative to said axis.

5. The agricultural baler of claim 1, wherein said cap has a side that is exposed when covering a portion of said tucker finger, said side being generally hemispherically shaped.

6. A tie system for use in an agricultural baler, the tie system comprising:
 a tucker finger rotatable about an axis relative to the baler, said tucker finger having a through opening centered about said axis, said tucker finger having a groove spaced apart from said through opening, said groove having inner and outer sides;
 a bearing installed in said through hole; and
 a cap covering said bearing, said through hole, and said groove, said cap having an annular protrusion that engages the outer side of the groove, said cap rotating with said tucker finger.

7. The tie system of claim 6, wherein said cap is substantially symmetrically connected to said tucker finger about said axis.

8. The tie system of claim 6, wherein a said groove is substantially concentric with said through opening.

9. The tie system of claim 8, wherein said cap is concentrically located relative to said axis.

10. The tie system of claim 6, wherein said cap has a side that is exposed when covering a portion of said tucker finger, said side being generally hemispherically shaped.

11. A tucker finger assembly for use with a tie system in an agricultural baler, the tucker finger assembly comprising:
 a tucker finger rotatable about an axis relative to the baler, said tucker finger having a through opening centered about said axis, said tucker finger having a groove spaced apart from said through opening, said groove having inner and outer sides;
 a bearing installed in said through hole; and
 a cap covering said bearing, said through hole, and said groove, said cap having an annular protrusion that engages the outer side of the groove, said cap rotating with said tucker finger.

12. The tucker finger assembly of claim 11, wherein said cap is substantially symmetrically connected to said tucker finger about said axis.

13. The tucker finger assembly of claim 11, wherein said groove is substantially concentric with said through opening.

* * * * *